US012675709B2

(12) United States Patent
Sharpe et al.

(10) Patent No.: US 12,675,709 B2
(45) Date of Patent: Jul. 7, 2026

(54) FILTERING COUNTERFACTUAL CONDITIONALS

(71) Applicant: Capital One Services, LLC, McLean, VA (US)

(72) Inventors: Samuel Sharpe, Cambridge, MA (US); Christopher Bayan Bruss, Washington, DC (US); Brian Barr, Schenectady, NY (US)

(73) Assignee: Capital One Services, LLC, McLean, VA (US)

( * ) Notice: Subject to any disclaimer, the term of this patent is extended or adjusted under 35 U.S.C. 154(b) by 488 days.

(21) Appl. No.: 18/338,329

(22) Filed: Jun. 20, 2023

(65) Prior Publication Data

US 2024/0428091 A1 Dec. 26, 2024

(51) Int. Cl.
*G06N 5/025* (2023.01)
*G06N 3/0475* (2023.01)
*G06N 5/045* (2023.01)
*G06N 20/00* (2019.01)

(52) U.S. Cl.
CPC ........... *G06N 5/025* (2013.01); *G06N 3/0475* (2023.01); *G06N 5/045* (2013.01); *G06N 20/00* (2019.01)

(58) Field of Classification Search
CPC ............................. G06N 3/0475; G06N 5/025
See application file for complete search history.

(56) References Cited

U.S. PATENT DOCUMENTS

| | | | | |
|---|---|---|---|---|
| 11,475,321 | B2 * | 10/2022 | Rangarajan | G06N 20/00 |
| 12,443,879 | B2 * | 10/2025 | Giovannini | G06N 3/0455 |
| 2021/0406316 | A1 * | 12/2021 | Buckley | H04L 51/02 |
| 2022/0309359 | A1 * | 9/2022 | Zhou | G06N 20/00 |
| 2022/0366233 | A1 * | 11/2022 | Le | G06N 3/096 |
| 2023/0376829 | A1 * | 11/2023 | Giovannini | G06N 3/0455 |

OTHER PUBLICATIONS

He et al. (CPL: Counterfactual Prompt Learning for Vision and Language Models, Proceedings of 2022 Conference on Empirical Methods in Natural Language Processing pp. 3407-3418, Dec. 7-11, 2022) (Year: 2022).*

* cited by examiner

*Primary Examiner* — Kate H Luo
(74) *Attorney, Agent, or Firm* — Foley & Lardner LLP

(57) ABSTRACT

A method and related system operations include determining a predicted category by providing a prediction model with a set of input feature values and generating a plurality of conditionals based on the set of input feature values for a set of features and the predicted category. The method also includes filtering the plurality of conditionals based on a knowledge base to obtain a selected conditional by generating a set of sub-conditional paths by providing, as an input for a prompt generator model, a candidate conditional of the plurality of conditionals to the prompt generator model and selecting the candidate conditional as the selected conditional based on a determination that the set of sub-conditional paths satisfies a set of criteria associated with a set of sequences of the knowledge base. The method further includes storing the selected conditional in a data structure in association with the set of input feature values.

20 Claims, 3 Drawing Sheets

300

100

300

FILTERING COUNTERFACTUAL CONDITIONALS

SUMMARY

Complex decision systems are employed in a wide range of applications, such as healthcare, utilities, and finance. These systems are designed to make decisions based on multiple variables and factors, taking into account various constraints and objectives. However, when these systems generate a decision, it may not always be clear how the decision was reached or what factors were considered. This is where counterfactual conditional generation comes in, offering a solution to explain alternative decisions that could have been made. By generating counterfactual conditionals, the decision-making process can be better understood, and insights can be gained on how to improve the decision-making system. This approach has significant potential to increase transparency and accountability in decision-making and could have far-reaching implications for the future of complex decision systems. However, without further operations, many such counterfactual conditionals may propose solutions that are not physically feasible or may be otherwise extremely difficult to implement.

Some embodiments may perform operations to overcome these issues or other issues by, after generating conditionals corresponding with an input feature value set, using a prompt generator model to generate reasoning paths that may be compared to a knowledge base. Some embodiments may then filter these generated conditionals based on the results of the comparison to remove conditionals indicated to have violated one or more rules written in the knowledge base. By filtering out these conditionals, some embodiments may provide a reduced set of conditionals that may indicate realistic changes to an input feature set which can then be reported to a downstream operation or presented to a user responsible for implementing changes to reflect a counterfactual conditional.

Some embodiments may determine a predicted category representing a category to be assigned to an entity characterized by a set of input values by providing a prediction model with a set of input feature values provided by a user via a user interface. The entity Some embodiments may then generate a plurality of conditionals based on the set of input feature values for a set of features and the predicted category, wherein the plurality of conditionals represents combinations of feature values associated with categories different from the predicted category. Some embodiments may then filter the plurality of conditionals based on a knowledge base to obtain a selected conditional. Some embodiments may filter the plurality of conditionals by performing operations such as (1) generating a plurality of sub-conditional paths by providing, as an input, a candidate conditional of the plurality of conditionals to a prompt generator model, (2) retrieving a set of sequences of the knowledge base based on the plurality of sub-conditional paths, (3) selecting the candidate conditional as the selected conditional based on a detected match between at least one sequence of the set of sequences and the plurality of sub-conditional paths, and (4) storing the selected conditional in a data structure in association with the set of input feature values. Some embodiments may then update the user interface to present the selected conditional to the user.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

Figure 1:
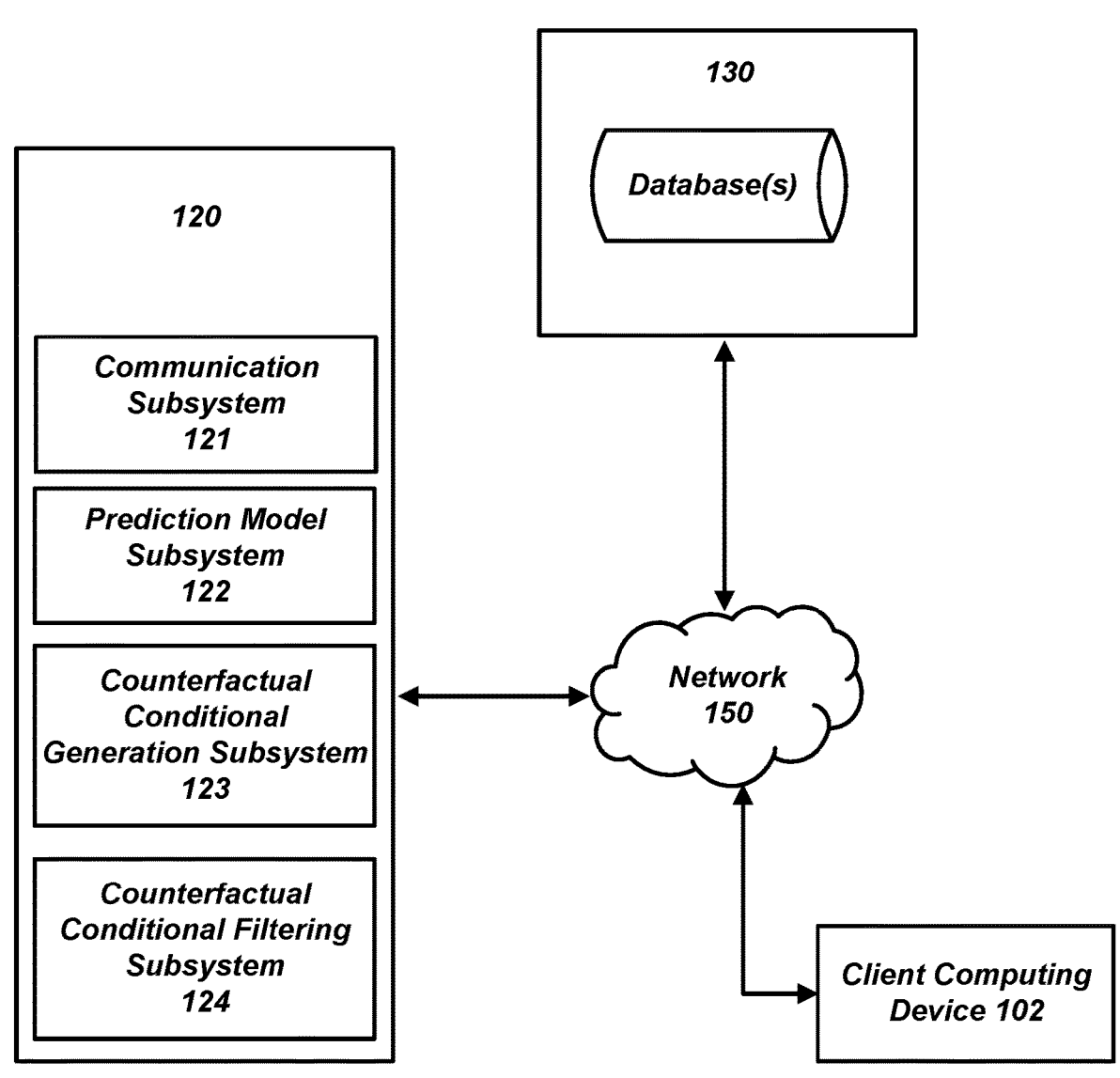
FIG. 1 illustrates a portion of an example system that generates filtered counterfactual conditionals, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

FIG. 1 illustrates a portion of an example system that generates filtered counterfactual conditionals, in accordance with some embodiments. A system 100 includes a client computing device 102. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120, where the server 120 may include non-transitory storage media storing program instructions to perform one or more operations of subsystems 121-124, including generating a counterfactual conditional (i.e., "counterfactual" or "conditional"). While one or more operations are described herein as being performed by particular components of the system 100, those operations may be performed by other components of the system 100 in some embodiments. For example, one or more operations described in this disclosure as being performed by the server 120 may instead be performed by the client computing device 102. Furthermore, some embodiments may communicate with an API of a third-party service via the network 150 to perform a machine learning model training operation or another type of prediction model training operation, obtain user information, obtain model parameters, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure, such as data associated with a prediction model, predictions, previously used input feature values, a conditional generation model, a knowledge base, a conditional filtering model, etc. For example, data objects of the set of databases 130 may include a history of input features and conditionals in association with their respective predictions.

In some embodiments, the communication subsystem 121 may retrieve information such as model parameters of a prediction model, user-related data or other inputs for a prediction model, etc. For example, the communication subsystem 121 may obtain a set of input feature values provided by the client computing device 102. The communication subsystem 121 may further send instructions to perform responsive actions based on one or more outputs of a conditional filtering subsystem 124, as elsewhere in this disclosure. For example, the communication subsystem 121 may send a filtered set of conditionals to the client computing device 102.

In some embodiments, a prediction model subsystem 122 may perform operations to generate predictions based on user-related information or other data. The prediction model subsystem 122 may include supervised learning models such as linear regression models, decision tree models, random forest models, support vector machine models, etc. Furthermore, the prediction model subsystem 122 may include deep learning models, such as neural network models. For example, the prediction model subsystem 122 may include a recurrent neural network, a convolutional neural network, reinforcement learning networks, etc. In some embodiments, the prediction model may be directly used as a decision system or may model output decisions made by a decision system. In some embodiments, the decision system being modeled may include greater complexity or permit inclusion of more inputs than the prediction model being used to model the decision system.

In some embodiments, the prediction model subsystem 122 may retrieve model parameters via the communication subsystem 121 and use the retrieved model parameters to configure a prediction model. Furthermore, the prediction model subsystem 122 may provide a prediction based on a set of input feature values obtained by the communication subsystem 121. The prediction model subsystem 122 may generate a prediction, where the prediction may include a numeric score, a category, a ranking value, etc.

In some embodiments, a conditional generation subsystem 123 may use one or more types of methods to generate conditionals based on a set of input feature values used by the prediction model subsystem 122. The conditional generation subsystem 123 may use various types of methods to generate a conditional based on input feature values. For example, some embodiments may use a rule-based method to generate a conditional by using pre-configured rules to tweak a predetermined feature of an input feature value. Alternatively, or additionally, some embodiments may use other methods to generate a set of conditionals based on input feature values, such as statistical methods, a Local Interpretable Model-Agnostic Explanation (LIME)-based method, a Diverse Counterfactual Explanations (DICE)-based method, a neural network-based model, etc. The conditionals generated may be used to inform a user on what feature values may be changed for a prediction model to make a target prediction. Alternatively, or additionally, conditionals may be used as data inputs for a downstream computer operation to determine a response to a prediction.

A conditional filtering subsystem 124 may perform operations to filter the conditional(s) generated using the conditional generation subsystem 123. The conditional filtering subsystem 124 may first use a prompt generator model, such as a chain-of-thought prompting model, to generate a sequence of sub-conditionals based on an initial counterfactual. For example, some embodiments may use a chain-of-thought prompting method to convert an initial counterfactual "Will Alpha satisfy Beta category if Delta feature is set to 92?" into a sequence of sub-conditional paths that includes "Alpha has a feature value equal to 30 for Delta feature. Beta Category has Threshold Theta for Delta feature. Increasing Delta feature for Alpha will require an increase of 62." Some embodiments may use a chain-of-thought prompting method similar to or the same as that described by He et al. (He, H., Zhang, H. and Roth, D., 2022. Rethinking with Retrieval: Faithful Large Language Model Inference. arXiv preprint arXiv:2301.00303), which is incorporated by reference herein. Furthermore, some embodiments may generate multiple sub-conditional paths for each conditional of a plurality of conditionals. In some embodiments, chain-of-thought prompting model may be used to reduce a conditional into sub-conditionals that a computer system may more accurately verify by comparison with information stored in a knowledge base.

The conditional filtering subsystem 124 may select one or more conditionals of a plurality of conditionals based on a determination that each respective conditional or a sub-conditional path of the respective conditional of the plurality of selected conditionals satisfies a set of criteria. For example, if a first conditional is used to generate a first sub-conditional path, and if a second conditional is used to generate a second sub-conditional path, and if both the first and second sub-conditional paths satisfy a set of criteria, some embodiments may select both the first and the second conditional without selecting the third conditional.

Some embodiments may select a conditional based on a determination that all of the sub-conditional paths of the selected conditional satisfy a set of criteria. For example, if a first conditional is used to generate a first plurality of sub-conditional paths, and if a second conditional is used to generate a second plurality of sub-conditional paths, and if each sub-conditional path of both the first and second sub-conditional paths satisfies a set of criteria, some embodiments may select both the first and the second conditionals. Alternatively, or additionally, some embodiments may select a conditional based on a determination that a majority of the sub-conditional paths of the selected conditional satisfy the set of criteria. Alternatively, some embodiments may select a conditional based on a determination that at least one of the sub-conditional paths of the selected conditional satisfies the set of criteria.

Some embodiments may select conditionals by excluding one or more conditionals from consideration. For example, some embodiments may determine that the generated sub-conditional paths of a conditional satisfy at least one criterion of a set of exclusionary criteria and, in response, exclude the conditional from a set of selected conditionals. After applying the set of exclusionary criteria to a set of generated sub-conditional paths of a set of conditionals, some embodiments may select the non-excluded conditionals for a collection of selected conditionals.

Figure 2:
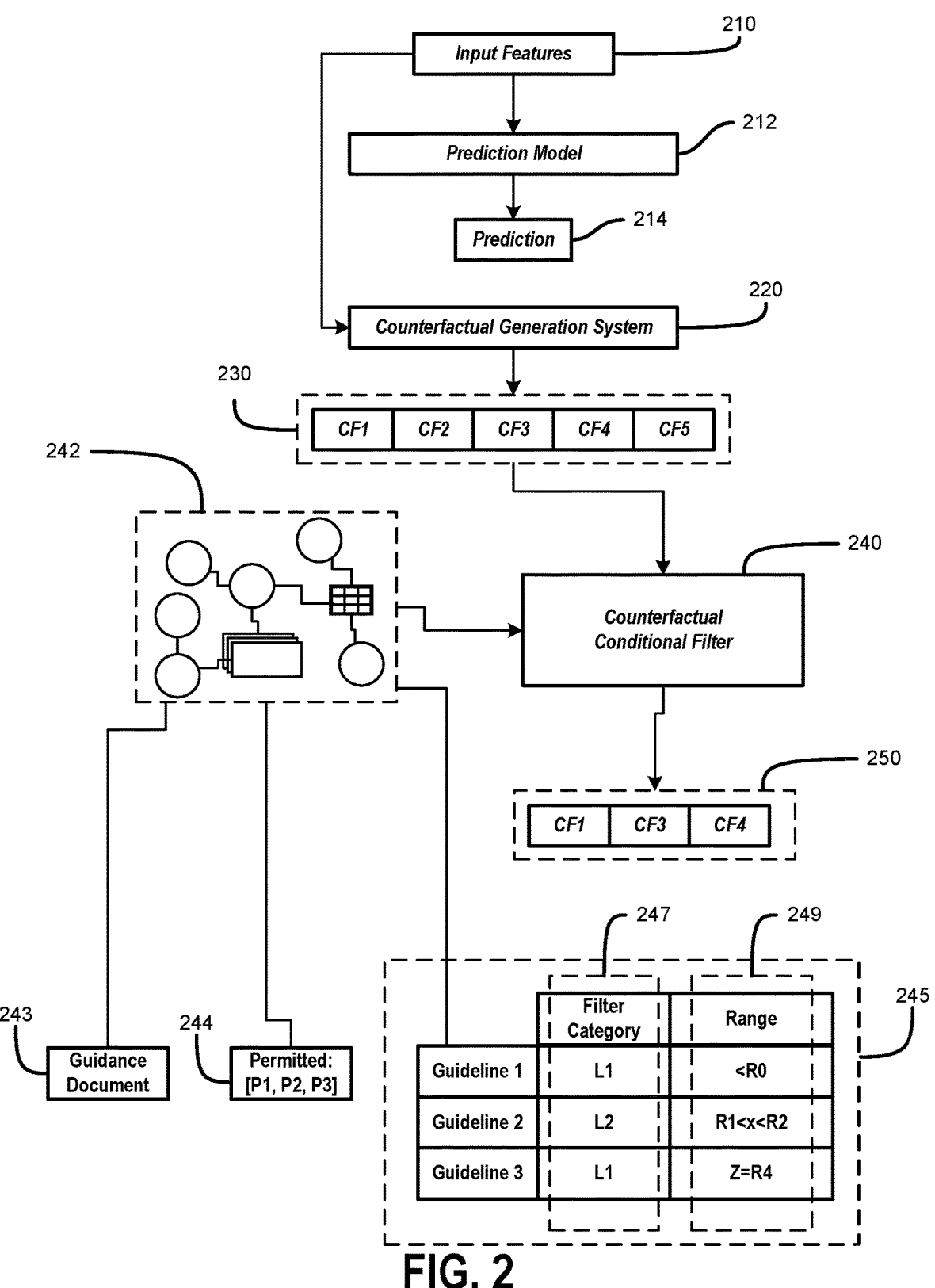
FIG. 2 illustrates a conceptual diagram of a counterfactual conditional filter in operation, in accordance with some embodiments.

FIG. 2 illustrates a conceptual diagram of a conditional filter in operation, in accordance with some embodiments. Some embodiments may collect a set of input features 210. The set of input features 210 may include information collected from a client computing device, such as a desktop computer, laptop computer, tablet computing device, etc. For example, some embodiments may receive input values from a user's interaction with the user interface (UI) displayed on a web browser of a tablet computing device. The input feature values may be values characterizing a user, another individual, an organization, etc. In some embodiments, the set of input features 210 may relate specifically to an individual and may include information such as an income value, biological age, gender, or geographic location. The geographic location may include a latitude and longitude coordinate, an identifier of a country or region of the country (e.g., a state), a ZIP Code, etc. Alternatively, or additionally, the set of input feature values may characterize an organization, such as a business organization or other organization, and may include information such as organization size, revenue, costs, organization age, etc.

Some embodiments may provide the set of input features to a prediction model 212 to obtain a prediction 214. The prediction model 212 may include one of various types of prediction models, such as a neural network model, regression models, classification models, time series models, clustering models, ensemble models, or Bayesian models. For example, the prediction model 212 may include a neural network model, such as a recurrent neural network model having more than two neural unit layers. In some embodiments, the prediction model 212 may be modified between different instances to accommodate updates to a training model or a change in a set of input feature values.

The prediction model 212 may output a prediction 214. The prediction 214 may include a category, a numeric value, text, etc. For example, the prediction 214 may include a binary prediction category representing a first category indicating that a set of account groups is assignable to a user associated with a set of input feature values and a second category indicating that the set of account groups is not assignable to a user associated with the set of input feature values. After being provided with a first set of input feature values, the prediction model 212 may output a first prediction categorizing an individual characterized with the first set of input feature values with the category "yes." After being provided with a second set of input feature values, the prediction model 212 may output a second prediction categorizing a second individual characterized by the second set of input feature values with the category "no." A predicted category may be assigned to an entity characterized by the set of input feature values provided to the prediction model 212, where the entity may include a user, a person other than the user, an organization, a system, or some other entity to which the set of input feature values is assigned.

Some embodiments may then generate one or more conditionals with the use of a counterfactual generation system 220. The counterfactual generation system 220 may obtain a set of unfiltered conditionals 230 by generating the conditionals using one or more conditional generation models, as described elsewhere in this disclosure. For example, some embodiments use a LIME-based method to generate at least three conditionals that rely on a counterfactual conditional filter 240 to reduce the at least three conditionals to a reduced number of conditionals, such as only one conditional or two conditionals. Some embodiments may use multiple types of counterfactual conditional generation systems or use other methods of obtaining conditionals. For example, some embodiments may obtain a first subset of the set of unfiltered conditionals 230 using a first set of operations representing a DICE-based method and obtain a second subset of the set of unfiltered conditionals 230 by obtaining user-provided counterfactual conditionals.

As described elsewhere in this disclosure, some embodiments may use the counterfactual conditional filter 240 to select conditionals from the set of unfiltered conditionals 230 for display or storage for downstream operations. Before using the counterfactual conditional filter 240 to filter conditionals, however, some embodiments may first configure a counterfactual conditional filter 240 with a knowledge base 242. The knowledge base 242 may store information organized in a domain-relevant manner and may include both structured and unstructured data. The knowledge base 242 may include facts, data, concepts, definitions, procedures, problem solutions, policies, regulations, and documentation, numeric ranges, spatial definitions in a geometric space or a feature space, etc. Portions of the knowledge base 242 may be generated from tabular data. The knowledge base 242 may include tabular data, lists, text documents, metadata, etc. In some embodiments, the knowledge base 242 may be selected from multiple knowledge bases. For example, some embodiments may select a specific knowledge base to use as the knowledge base 242 after determining that a set of features matches with the first domain "D1." Some embodiments may then use a set of values of the selected knowledge base to update the counterfactual conditional filter 240.

Some embodiments may construct the knowledge base 242 from different types of information. For example, some embodiments may use natural language text such as a guidance document 243 to generate the knowledge base 242. Alternatively, or additionally, some embodiments may use lists or key-value maps or other data structures such as a list 244 or a data table 245 to generate the knowledge base 242. As described elsewhere in this disclosure, some embodiments may include a filter category to indicate a strictness for a rule or guideline derived from knowledge base data. For example, a column 247 may indicate a filter category for a particular table record. Furthermore, as discussed elsewhere in this disclosure, by using information that may be designed for human interpretation, some embodiments may increase the accuracy of the counterfactual conditional filter 240. For example, a text document used to generate a knowledge base may include a set of tokens or be converted into a set of tokens. Some embodiments may then include a set of sequences in the knowledge base, where the set of sequences includes the set of tokens. The counterfactual conditional filter 240 may then select a conditional based on a determination that a criterion based on the set of tokens is satisfied by the selected conditional.

Some embodiments may use the counterfactual conditional filter 240 to a select a subset of conditionals from the set of unfiltered conditionals 230. The counterfactual conditional filter 240 may filter a plurality of conditionals by generating sub-conditional paths (i.e., "reasoning paths") for each of the plurality of conditionals. The counterfactual conditional filter 240 may apply chain-of-thought prompting to generate a sequence of sub-statements for each candidate conditional in the plurality of conditionals. For example, some embodiments may provide the counterfactual conditional filter 240 with an initial counterfactual of "If Linda's age is changed to 24, can Linda be approved for category Z?" The counterfactual conditional filter 240 may then generate a sequence of sub-conditionals by applying a prompt generator model, such as a chain-of-thought model, to decompose an initial conditional into a first sequence of sub-conditionals, such as "Linda is 23 years old. Linda will be approved if she is 24 years old. Linda's age is increased to 24. Linda will be approved." Some embodiments may use a prompt generator model multiple times for a same conditional such that one conditional may be used to generate multiple sub-conditional paths.

Some embodiments may then compare the set of sub-conditional statements for each sub-conditional path of a conditional to a set of criteria derived from a knowledge base to determine whether to select the sub-conditionals for display, storage, or processing. In some embodiments, the set of criteria includes a comparison with data from a knowledge base 242, such as a comparison with tokens or token sequences of the knowledge base 242, numeric values of the knowledge base 242, numeric boundaries of the knowledge base 242, boundaries in a feature space characterized by the knowledge base 242, etc. For example, the criteria associated with the knowledge base 242 may include a matching criterion such that a sequence of sub-conditionals that includes a first sequence of tokens also includes a second sequence of tokens that matches with a stored sequence retrieved from the knowledge base 242.

Alternatively, or additionally, the criteria associated with the knowledge base 242 may include an inclusive range criterion such that the inclusive range criterion is satisfied by a sub-conditional if a numeric value of the sub-conditional is within a numeric range indicated by the knowledge base 242. In some embodiments, the numeric range may be obtained from the data table 245 in a column 249. Some embodiments may then select one or more candidate conditionals based on a determination that their corresponding sub-conditional paths satisfy a set of criteria derived from the knowledge base 242. For example, the counterfactual conditional filter 240 may be provided with the set of unfiltered conditionals 230 as inputs and produce, as outputs, selected conditionals 250. As shown by a comparison of the selected conditionals 250 and the set of unfiltered conditionals 230, the counterfactual conditional filter 240 may filter the set of unfiltered conditionals 230 to remove one or more conditionals from the set of unfiltered conditionals 230 to generate the selected conditionals 250.

Figure 3:
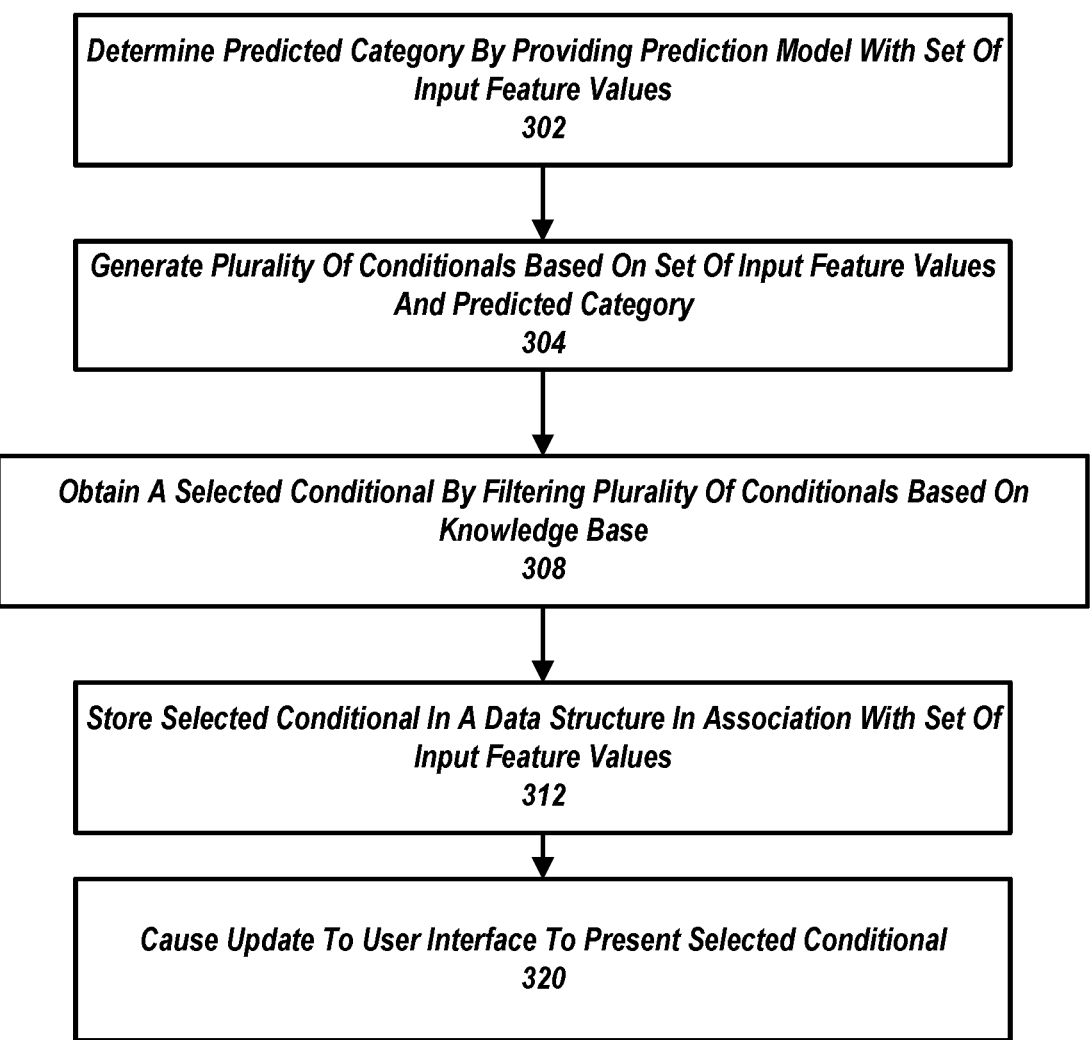
FIG. 3 is a flowchart of operations for an exemplary method to filter a set of counterfactual conditionals, in accordance with one or more embodiments.

FIG. 3 is a flowchart 300 of operations for an exemplary method to filter a set of conditionals, in accordance with one or more embodiments. Some embodiments may determine a predicted category by providing a prediction model with a set of input feature values, as indicated by block 302. Some embodiments may obtain a set of input features from a client computing device and provide the set of input features a prediction model to determine a prediction based on the set of input features. For example, some embodiments may obtain, as input feature values, an income level, an age, and a ZIP code and provide the input feature values to a prediction model to generate a first prediction.

Some embodiments may generate a plurality of conditionals based on the set of input feature values and the prediction, as indicated by block 304. As discussed elsewhere in this disclosure, various types of operations may be performed to generate a conditional based on an initial set of input features and a predicted category corresponding with the initial set of input features. The conditionals may be generated to provide candidate input features that do not correspond with the predicted category. Some embodiments may use a machine learning model to generate a conditional. For example, some embodiments may use a generative adversarial network (GAN) to generate a set of conditionals based on a set of input feature values.

Some embodiments may generate a conditional by modifying one or more feature values of a set of input feature values. For example, after receiving an initial set of input feature values and determining a prediction category by providing the initial set of input features to a prediction model, some embodiments may modify the initial set of input feature values. Some embodiments may then provide the modified set of input feature values to the prediction model to generate a second predicted category. If the second predicted category satisfies a set of criteria associated with counterfactual generation, some embodiments may then use the conditional as an initial conditional to be filtered by a conditional filtering system described elsewhere in this disclosure. The set of criteria may include a criterion that the first predicted category is different from the second predicted category, a comparison criterion that the second predicted category matches with a pre-configured target category, etc. For example, some embodiments may perform a comparison operation between a second predicted category and a target predicted category and determine that the second predicted category matches with the target predicted category.

Some embodiments may generate a conditional using a DICE-based method or a method adapted from a DICE-based method. For example, some embodiments may first generate a plurality of candidate feature value sets by changing the values of one or more feature values of a set of input feature values, where the plurality of candidate feature value sets may include combinations of feature values such that each combination represents a candidate feature value set that has been modified with respect to an initial feature set. Some embodiments may then determine distance metrics for each candidate feature value set of the plurality of candidate feature value sets based on a feature space distance between the set of input feature values and a respective combination of candidate feature values. The distance metrics may be computed as a Manhattan distance, a Euclidean distance, or another type of distance metric. Some embodiments may then determine a target distribution based on the plurality of distance metrics, where the distribution includes a distribution based on ranking sorted by the distance metric values. For example, some embodiments may determine an initial set of the conditionals that are associated with combinations of candidate feature values that are closest to an input feature set, where the initial set of conditionals may then be filtered by a conditional filtering system, as described elsewhere in this disclosure.

Some embodiments may use a LIME-based method or LIME-inspired method to generate a plurality of candidate conditionals. For example, some embodiments may generate or otherwise obtain a set of local explainability weights associated with features of a set of input feature values. In some embodiments, the set of local explainability weights may include a plurality of weights retrieved from a knowledge base. In some embodiments, each weight of the plurality of weights may correspond with a sequence of a set of sequences stored in the knowledge base. After generating an initial score for a set of sub-conditional paths based on an initial set of input feature values, where the initial score may represent an initial value used to determine a first prediction, some embodiments may use the weights to modify the initial score. To use the weights, some embodiments may select a target feature of a set of input features for modification and determine a modification value based on the knowledge base-obtained weight associated with the target feature. After modifying the target feature of the input feature set by the modification value, some embodiments may then generate a second score for a new set of sub-conditional paths generated from the modified set of input feature values, where the second score may be used to determine a second prediction that is different from the first prediction. For example, a prediction model may output a first score based on an initial input feature set, where the first score does not satisfy a score threshold and is thus associated with a first predicted category. After modifying a target feature of the input feature, some embodiments may provide the modified feature set to a prediction model to determine a second score that satisfies the score threshold. Based on a determination that the score threshold is satisfied by the second score, some embodiments may associate the modified feature set with a second predicted category different from the first predicted category.

Some embodiments may use a set of statistical methods or statistics-inspired methods to generate one or more conditionals. For example, some embodiments may obtain a history of previously provided input feature sets and a corresponding set of predicted categories or other predictions associated with the history of previously provided input feature sets. Some embodiments may then determine a set of likelihood values for the set of predicted categories with respect to feature values based on this obtained plurality of previously provided input feature sets. In some embodiments, each likelihood value of the set of likelihood values may indicate a likelihood that a predicted category value will be predicted by a prediction model based on a feature value of the plurality of previously provided input feature sets. Some embodiments may then generate multiple combinations of feature values associated with a target category or other type of target prediction.

In some embodiments, each respective feature value combination of this plurality of combinations of feature values may be determined by the statistical methods to result in the target prediction when the respective feature value combination is provided to a prediction model. For example, some embodiments may determine that the probability that values within a first range of feature values for a first feature will result in a target prediction when provided to a prediction model is a first likelihood that is equal to 68.5%. Some embodiments may then determine that the probability that values within a second range of feature values for a second feature will result in a target prediction when provided to a prediction model is a second likelihood equal to 81.3%. Some embodiments may then use statistical methods to determine that a combination of feature values within the first and second ranges for their respective features are associated with a likelihood value, where providing the prediction model with the feature value combination has a likelihood of outputting the target prediction equal to the likelihood value. In cases where the likelihood value associated with a feature value combination is greater than a target prediction likelihood threshold, some embodiments may use the feature value combination to generate a candidate conditional.

Some embodiments may permit a user to provide their own set of conditionals. For example, some embodiments may receive a user-entered conditional that the user had entered into a UI displayed on a client computing device. After receiving the user-entered conditional from the client computing device, a server or other computing system may add the user-entered conditional to a set of unfiltered conditionals. For example, some embodiments may generate a first set of conditionals using a DICE-based method, generate a second set of conditionals using a LIME-based method, and obtain a set of user-entered conditionals. Some embodiments may then combine the first set of conditionals, the second set of conditionals, and the set of user-entered conditionals into an unfiltered set of conditionals that, as described elsewhere in this disclosure, may be filtered to determine a set of selected conditionals.

Some embodiments may generate other non-category types of predictions with a prediction model, where such predictions may include generated text, numeric values, etc. With such prediction models, some embodiments may use criteria such as a criterion that a numeric value is within a target range, that a numeric value is equal to a target value, that a text includes one of a set of target tokens, etc.

Some embodiments may obtain a selected conditional by filtering the plurality of conditionals based on a knowledge base, as indicated by block 308. Some embodiments may filter the plurality of conditionals by applying a set of criteria to the plurality of conditionals and selecting the conditionals that satisfy the set of criteria. The set of criteria may be derived from data obtained from a knowledge base, and may include one or more criteria that a value of the conditional or a sub-conditional generated from the conditional matches a value obtained from the knowledge base, is within a range defined by a set of values from the knowledge base, exceeds a threshold obtained from the knowledge base, includes a pattern obtained from the knowledge base, includes a symbol obtained from the knowledge base, etc.

As discussed elsewhere, some embodiments may use a conditional to determine a sequence of sub-conditionals representing a sub-conditional path. Some embodiments may then determine whether the sub-conditional path derived from a conditional satisfies the set of criteria, where a result of this determination may indicate whether to filter the conditional from a subset of conditionals that are to be displayed or stored in persistent memory. Some embodiments may determine a sub-conditional path using a chain-of-thought prompting method to generate multiple phrases representing reasoning sub-elements to arrive at a statement representing the conditional.

Furthermore, some embodiments may use chain-of-thought prompting to generate multiple sequences of sub-conditionals. Some embodiments may then filter out sequences which include one or more sub-conditionals indicated to be contrary to a set of rules by applying a set of criteria representing the set of rules to the sub-condition. In some embodiments, filtering out a sequence may result in filtering out the conditional used to generate the sequence.

As discussed elsewhere, one or more criteria of the set of criteria may be based on a result indicating a detected match between a sub-conditional path and a token sequence of a set of sequences. Some embodiments may include one or more criteria to filter out conditionals associated with sub-conditionals that match with at least one sequence of a set of sequences. The set of criteria may include a criterion that a sub-conditional path does not include a sequence of tokens that matches with at least one token sequence of a set of sequences stored in the knowledge base, where the set of sequences represents a set of prohibited sequences. For example, some embodiments may generate a first sub-conditional path based on a first conditional, where the first sub-conditional path includes the token sequence "Username's age must increase." Some embodiments may then determine that this token sequence matches with a prohibited token sequence "age must increase" and, in response to a result indicating that a token sequence of the first sub-conditional path matches with the prohibited token sequence, filter the first conditional such that it is not selected for later storage or presentation.

Some embodiments may include one or more criteria to filter out one or more conditionals associated with sub-conditionals, where none of the sub-conditionals match with at least one sequence of a set of sequences. The set of criteria may include a criterion that at least one sub-conditional path of a conditional includes a sequence of tokens that matches with at least one token sequence of a set of sequences stored in the knowledge base, where the set of sequences represents a set of required sequences. For example, some embodiments may determine a set of sub-conditional paths based on one or more conditionals. Some embodiments may then determine a detected mismatch between the set of sub-conditional paths and a set of required token sequences by detecting that none of the token sequences of the generated sub-conditional paths match with the required token sequence. In response to a result indicating this detected mismatch between the set of sub-conditional paths and the set of required token sequences, some embodiments may filter out the one or more conditionals such that it is not selected for later storage or presentation in a collection of selected conditionals.

Some embodiments may select a conditional based on a determination that at least one sub-conditional path generated from the conditional includes a target token sequence. For example, some embodiments may determine a set of sub-conditional paths based on a first conditional. Some embodiments may then determine that at least one of the sub-conditional paths of the generated sub-conditional paths matches with a token sequence "token token token" and, in response to a result indicating that a token sequence of the first sub-conditional path matches with the required token sequence, filter the first conditional such that it is not selected for later storage or presentation.

Some embodiments may select a specific knowledge base when filtering a set of conditionals. Selecting a knowledge base may include directly selecting a knowledge base and then training a learning model to filter conditionals with the selected knowledge base. Alternatively, or in addition, some embodiments may select a knowledge base by selecting a learning model that was generated or configured with the knowledge base. For example, a conditional filtering system may have access to multiple knowledge bases and receive an input feature set associated with a first domain, where each knowledge base is stored across a plurality of data stores or generated from data provided by the plurality of data stores. The conditional filtering system may then select a first knowledge base of the multiple knowledge bases based on a determination that the first knowledge base is associated with the first domain by selecting a conditional filtering model configured with the first knowledge base.

Some embodiments may receive instructions or other data from a UI indicating a user's selection of a knowledge base and, based on the user-provided data, select the knowledge base. For example, a client computing device may present, via a web browser operating on the client device, a UI that includes a dropdown menu, checkbox, or other interactive UI element. A user may use the UI to provide a value to a server via the interactive UI element. The server may receive the user-provided value to cause the selection of a knowledge base that is mapped to or otherwise corresponds with the user-provided value.

In some embodiments, the knowledge base used to determine a set of criteria for the selection of conditionals may include numeric values, where the numeric values may include target values, boundaries, function parameters, etc. For example, a knowledge base may include a numeric value representing a maximum difference threshold. In some embodiments, a conditional that suggests a feature value that exceeds an initial feature value by the maximum difference threshold may be labeled as an unrealistic conditional. For example, some embodiments suggest a conditional that indicates a vehicle speed of 10 kilometers per hour (km/hr) after receiving an input feature set indicating a vehicle speed of 5 km/hr, where the maximum difference threshold may be equal to 2 km/hr, where the value 2 km/hr may be retrieved from a knowledge base. As a result of the difference between the feature value of the conditional and the feature value of the input feature set being greater than the maximum difference threshold, some embodiments may label the conditional as unrealistic and not select the conditional for display or storage in a collection of selected conditionals.

Some embodiments may account for different categories of rules, guidelines, or other tags to filter conditionals. For example, some embodiments may separate filter criteria into a first filter category "impossible" and a second filter category "unlikely." A filter category may be based on information stored in a knowledge base. For example, a knowledge base may include metadata tags associated with text documents or a portion of a text document, where the metadata indicates whether a criterion extracted from the text document or portion of the text document is labeled with the first filter category or the second filter category. Alternatively, or additionally, some embodiments may obtain criteria from values of a data table or other data structure, where the data structure may itself include a metadata tag to indicate a filter category.

When accounting for different filter categories, some embodiments may select and assign different conditionals for different subsets of conditionals associated with the different filter categories. For example, some embodiments may select a first subset of conditionals of an unfiltered set of conditionals for a first collection of conditionals labeled "realistic," select a second subset of conditionals from the unfiltered set of conditionals for a second collection of conditionals labeled "unrealistic," and select a third subset of conditionals from the unfiltered set of conditionals for a third collection of conditionals labeled "impossible." For example, some embodiments may generate a first subset of sub-conditional paths for a first set of conditionals and, based on a determination that the first subset of sub-conditional paths satisfies a first set of selection criteria, select the first subset of conditionals for a first collection of conditionals labeled "realistic conditionals." Some embodiments may then generate a second subset of sub-conditional paths for a second set of conditionals and, based on a determination that the second subset of sub-conditional paths does not satisfy the first set of selection criteria but does satisfy a second set of selection criteria, select the second subset of conditionals for a second collection of conditionals labeled "unrealistic conditionals." In some embodiments, the first set of criteria may include exclusionary criteria that are derived from both rules or guidelines of a knowledge base labeled as "unrealistic" and "impossible." In contrast, the second set of criteria may include exclusionary criteria that are derived only from rules or guidelines of a knowledge base labeled as "impossible."

Some embodiments may store the selected conditional in a data structure in association with the set of input feature values, as indicated by block 312. Some embodiments may store a set of selected conditionals as text, modified feature values, data objects, or other types of data. Some embodiments may store selected conditionals in a table of a database management system (DBMS), key-value stores, a tree structure, graph structure, or other type of data structure. Furthermore, the data structure may be stored on a single computing device or distributed across multiple computing devices.

Some embodiments may use a selected conditional as an additional contribution to a knowledge base. For example, some embodiments may determine a selected conditional. Some embodiments may then store the selected conditional in a knowledge base, where storing a selected conditional may include storing a candidate input feature set, a prediction associated with the selected conditional, or other values associated with the selected conditional. After storing the selected conditional in the knowledge base, some embodiments may update a prediction model or a learning model used to filter conditionals based on the knowledge base.

Some embodiments may cause an update to a UI to present the selected conditional, as indicated by block 320. For example, some embodiments may send a collection of selected conditionals to a client computing device. In some embodiments, the client computing may then display the selected conditionals to a user. Furthermore, in some embodiments, the transmission of the selected conditionals may form part of a client-server workflow, where the client may send an initial input feature set to a server or another set of computing devices, wherein the server or other set of computing devices may perform operations described in this disclosure to determine a selected set of conditionals. Some embodiments may then send the selected set of conditionals to the client computing device, which may display the selected set of conditionals on a UI presented by the client computing device.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described and/or without one or more of the operations discussed. Additionally, the order in which the processing operations of the methods are illustrated (and described below) is not intended to be limiting.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIG. 1 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combination of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems 121-124 or other subsystems. The processors may be programmed to execute computer program instructions by software, hardware, or firmware; some combination of software, hardware, or firmware; and/or other mechanisms for configuring processing capabilities on the processors.

It should be appreciated that the description of the functionality provided by the different subsystems described herein is for illustrative purposes and is not intended to be limiting, as any of subsystems 121-124 may provide more or less functionality than is described. For example, one or more of subsystems 121-124 may be eliminated, and some or all of its functionality may be provided by other ones of subsystems 121-124. As another example, additional subsystems may be programmed to perform some or all of the functionality attributed herein to one of subsystems 121-124 described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to) rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or") unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D and a case in which processor 1 performs step/operation A, processor 2 performs step/operation B and part of step/operation C, and processor 3 performs part of step/operation C and step/operation D) unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C" and the like (e.g., "at least Z of A, B, or C") refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

Unless the context clearly indicates otherwise, ordinal numbers used to denote an item do not define the item's position. For example, an item may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

1. A method comprising: determining a predicted category by providing a prediction model with a set of input feature values; generating a plurality of conditionals based on the set of input feature values for a set of features and the predicted category; filtering the plurality of conditionals based on a knowledge base to obtain a selected conditional by: generating a set of sub-conditional paths by providing, as an input for a prompt generator model, a candidate conditional of the plurality of conditionals to the prompt generator model; selecting the candidate conditional as the selected conditional based on a determination that the set of sub-conditional paths satisfies a set of criteria associated with a set of sequences of the knowledge base; and storing the selected conditional in a data structure in association with the set of input feature values.

2. A method comprising: predicting a category to be assigned to an entity characterized by a set of input feature values by providing a prediction model with the set of input feature values provided by a user via a user interface; generating a plurality of conditionals based on the set of input feature values for a set of features and the predicted category, wherein the plurality of conditionals represents combinations of feature values associated with categories different from the predicted category; filtering the plurality of conditionals based on a knowledge base to obtain a selected conditional by: generating a plurality of sub-conditional paths by providing, as an input, a candidate conditional of the plurality of conditionals to a prompt generator model; retrieving a set of sequences of the knowledge base based on the plurality of sub-conditional paths; selecting the candidate conditional as the selected conditional based on a result indicating whether a sequence of the set of sequences matches with a path of the plurality of sub-conditional paths; and storing the selected conditional in a data structure in association with the set of input feature values; and updating the user interface to present the selected conditional to the user.

3. A method comprising: determining a predicted category by providing a prediction model with a set of input feature values; generating a plurality of conditionals based on the set of input feature values for a set of features and the predicted category; filtering the plurality of conditionals based on a knowledge base to obtain a selected conditional by: generating a plurality of sub-conditional paths by providing, as an input, a candidate conditional of the plurality of conditionals to a prompt generator model; retrieving a set of sequences of the knowledge base based on the plurality of sub-conditional paths; and selecting the candidate conditional as the selected conditional based on a detected match between at least one sequence of the set of sequences and the plurality of sub-conditional paths; and storing the selected conditional in a data structure in association with the set of input feature values; and updating a user interface to present the selected conditional.

4. The method of any of embodiments 1 to 4, wherein filtering the plurality of conditionals comprises determining a plurality of selected conditionals, wherein the plurality of selected conditionals comprises the selected conditional.

5. The method of embodiment 4, wherein: the set of sequences comprises a first sequence and a base sequence; the candidate conditional is a first candidate conditional; the selected conditional is a first selected conditional; filtering the plurality of conditionals further comprises generating a second plurality of sub-conditional paths by providing, as another input for the prompt generator model, a second candidate conditional of the plurality of conditionals to the prompt generator model; and determining the plurality of selected conditionals comprises determining the plurality of selected conditionals without including the second candidate conditional based on a detected mismatch between the set of sequences and the second plurality of sub-conditional paths.

6. The method of any of embodiments 1 to 5, further comprising updating the knowledge base based on the selected conditional.

7. The method of any of embodiments 1 to 6, further comprising selecting the knowledge base of a plurality of data stores based on the set of features.

8. The method of any of embodiments 1 to 7, wherein the predicted category is a first predicted category, and wherein generating the plurality of conditionals comprises: generating a modified set of input feature values by modifying a feature value of the set of input feature values; providing the modified feature value to the prediction model to generate a second predicted category; and generating a conditional of the plurality of conditionals based on a comparison between the second predicted category and the first predicted category.

9. The method of embodiment 8, wherein modifying the feature value comprises: generating a plurality of candidate feature value sets based on the set of input feature values; determining a plurality of distance metrics by determining distances between the set of input feature values and the plurality of candidate feature value sets; determining a target distribution based on the plurality of distance metrics; and selecting the modified set of input feature values from the plurality of candidate feature value sets based on the target distribution.

10. The method of any of embodiments 8 to 9, wherein modifying the feature value comprises: generating a set of local explainability weights associated with features of the set of input feature values; selecting a target feature for modification based on the set of local explainability weights, wherein the feature value corresponds with the target feature; and modifying the set of input feature values by modifying the feature value of the set of input feature values corresponding with the target feature.

11. The method of any of embodiments 1 to 10, wherein retrieving the set of sequences comprises: obtaining a user-provided value that was selected with a user interface; and selecting a portion of the knowledge base based on the user-provided value, wherein at least one sequence of the set of sequences is stored in the portion of the knowledge base.

12. The method of any of embodiments 1 to 11, wherein generating the plurality of conditionals comprises: obtaining a plurality of previously provided input feature sets comprising the set of input feature values and a set of predicted categories associated with the plurality of previously provided input feature sets, wherein the set of predicted categories comprises the predicted category; determining a set of likelihood values, wherein each likelihood value of the set of likelihood values indicates a likelihood of a predicted category value based on a feature value of the plurality of previously provided input feature sets; generating a plurality of combinations of feature values indicated to satisfy a target prediction likelihood threshold based on the set of likelihood values; and generating the plurality of conditionals based on the plurality of combinations of feature values.

13. The method of any of embodiments 1 to 12, wherein: generating the plurality of conditionals comprises generating at least three conditionals; filtering the plurality of conditionals comprises determining a plurality of selected conditionals, wherein the plurality of selected conditionals does not comprise at least one conditional of the plurality of conditionals.

14. The method of any of embodiments 1 to 13, further comprising: obtaining, from a user, a user-entered conditional; and updating the plurality of conditionals to comprise the user-entered conditional.

15. The method of any of embodiments 1 to 14, wherein a first sequence of the set of sequences indicates a maximum difference threshold for a feature of the set of input feature values.

16. The method of any of embodiments 1 to 15, wherein: the knowledge base is associated with a plurality of weights, wherein each respective sequence of the set of sequences is associated with a respective weight of the plurality of weights: determining a score based on whether the set of sub-conditional paths satisfies the set of criteria; updating the score based on the plurality of weights; and selecting the candidate conditional as the selected conditional based on a determination that the score satisfies a score threshold.

17. The method of any of embodiments 1 to 16, wherein the set of input feature values comprises an income value, an age, or a geographic location.

18. The method of any of embodiments 1 to 17, the operations further comprising obtaining a value of the set of input feature values from a client computing device.

19. The method of any of embodiments 1 to 18, wherein the knowledge base comprises a text document, and wherein a first sequence of the set of sequences comprises a token sequence of the text document.

20. The method of any of embodiments 1 to 19, wherein: the set of sequences comprises a first sequence; the set of sub-conditional paths is a first set of sub-conditional paths; the first sequence is associated with a first category; the candidate conditional is a first candidate conditional; filtering the plurality of conditionals comprises: generating a second set of sub-conditional paths by providing, as a second input, a second candidate conditional of the plurality of conditionals to the prompt generator model; associating the second candidate conditional with the first category based on a determination that the second set of sub-conditional paths does not satisfy a criterion associated with the first sequence; and the operations further comprise: updating a user interface to present the second candidate conditional based on an association between second candidate conditional with the first category.

21. One or more tangible, non-transitory, machine-readable media storing instructions that, when executed by a set of processors, cause the set of processors to effectuate operations comprising those of any of embodiments 1 to 20.

22. A system comprising: a set of processors and memory storing computer program instructions that, when executed by the set of processors, cause the set of processors to effectuate operations comprising those of any of embodiments 1 to 20.

What is claimed is:

1. A system for generating conditionals corresponding with an input feature value set by using a prompt generator model, the system comprising one or more processors and a memory storing program instructions that, when executed by the one or more processors, cause the one or more processors to perform operations comprising:

predicting a category representing a decision system output by providing a prediction model with a set of input feature values provided by a user via a user interface;

generating a plurality of conditionals based on the set of input feature values for a set of features and the predicted category, wherein the plurality of conditionals represents combinations of feature values associated with categories different from the predicted category;

filtering the plurality of conditionals based on a knowledge base to obtain a selected conditional by:

generating a plurality of sub-conditional paths by providing, as an input, a candidate conditional of the plurality of conditionals to a prompt generator model;

retrieving a set of sequences of the knowledge base based on the plurality of sub-conditional paths; and selecting the candidate conditional as the selected conditional based on a detected match between at least one sequence of the set of sequences and the plurality of sub-conditional paths;

storing the selected conditional in a data structure, wherein the selected conditional is stored in association with the set of input feature values; and causing an update to the user interface to present the selected conditional to the user.

2. A method comprising:

determining a predicted category by providing a prediction model with a set of input feature values;

generating a plurality of conditionals based on the set of input feature values for a set of features and the predicted category;

filtering the plurality of conditionals based on a knowledge base to obtain a selected conditional by:

generating a plurality of sub-conditional paths by providing, as an input, a candidate conditional of the plurality of conditionals to a prompt generator model;

retrieving a set of sequences of the knowledge base based on the plurality of sub-conditional paths; and selecting the candidate conditional as the selected conditional based on a result indicating whether a sequence of the set of sequences matches with a path of the plurality of sub-conditional paths;

storing the selected conditional in a data structure in association with the set of input feature values; and causing an update to a user interface to present the selected conditional.

3. The method of claim 2, wherein filtering the plurality of conditionals comprises determining a plurality of selected conditionals, wherein the plurality of selected conditionals comprises the selected conditional.

4. The method of claim 3, wherein:

the candidate conditional is a first candidate conditional;

the selected conditional is a first selected conditional;

filtering the plurality of conditionals further comprises generating a second plurality of sub-conditional paths by providing, as another input for the prompt generator model, a second candidate conditional of the plurality of conditionals to the prompt generator model; and determining the plurality of selected conditionals comprises determining the plurality of selected conditionals without including the second candidate conditional based on a detected mismatch between the set of sequences and the second plurality of sub-conditional paths.

5. The method of claim 2, further comprising updating the knowledge base based on the selected conditional.

6. The method of claim 2, further comprising selecting the knowledge base of a plurality of data stores based on the set of features.

7. The method of claim 2, wherein the predicted category is a first predicted category, and wherein generating the plurality of conditionals comprises:

generating a modified set of input feature values by modifying a feature value of the set of input feature values;

providing the modified feature value to the prediction model to generate a second predicted category; and generating a conditional of the plurality of conditionals based on a comparison between the second predicted category and the first predicted category.

8. The method of claim 7, wherein modifying the feature value comprises:

generating a plurality of candidate feature value sets based on the set of input feature values;

determining a plurality of distance metrics by determining distances between the set of input feature values and the plurality of candidate feature value sets;

determining a target distribution based on the plurality of distance metrics; and selecting the modified set of input feature values from the plurality of candidate feature value sets based on the target distribution.

9. The method of claim 7, wherein modifying the feature value comprises:

generating a set of local explainability weights associated with features of the set of input feature values;

selecting a target feature for modification based on the set of local explainability weights, wherein the feature value corresponds with the target feature; and modifying the set of input feature values by modifying the feature value of the set of input feature values corresponding with the target feature.

10. The method of claim 2, wherein retrieving the set of sequences comprises:

obtaining a user-provided value that was selected with the user interface; and selecting a portion of the knowledge base based on the user-provided value, wherein at least one sequence of the set of sequences is stored in the portion of the knowledge base.

11. The method of claim 2, wherein generating the plurality of conditionals comprises:

obtaining a plurality of previously provided input feature sets comprising the set of input feature values and a set of predicted categories associated with the plurality of previously provided input feature sets, wherein the set of predicted categories comprises the predicted category;

determining a set of likelihood values, wherein each likelihood value of the set of likelihood values indicates a likelihood of a predicted category value based on a feature value of the plurality of previously provided input feature sets;

generating a plurality of combinations of feature values indicated to satisfy a target prediction likelihood threshold based on the set of likelihood values; and generating the plurality of conditionals based on the plurality of combinations of feature values.

12. A set of non-transitory, machine-readable media storing program instructions that, when executed by one or more processors, cause the one or more processors to perform operations comprising:

determining a predicted category by providing a prediction model with a set of input feature values;

generating a plurality of conditionals based on the set of input feature values for a set of features and the predicted category;

filtering the plurality of conditionals based on a knowledge base to obtain a selected conditional by:

generating a set of sub-conditional paths by providing, as an input for a prompt generator model, a candidate conditional of the plurality of conditionals to the prompt generator model; and selecting the candidate conditional as the selected conditional based on a determination that the set of sub-conditional paths satisfies a set of criteria associated with a set of sequences of the knowledge base; and storing the selected conditional in a data structure in association with the set of input feature values.

13. The set of non-transitory, machine-readable media of claim 12, wherein:

generating the plurality of conditionals comprises generating at least three conditionals; and filtering the plurality of conditionals comprises determining a plurality of selected conditionals, wherein the plurality of selected conditionals does not comprise at least one conditional of the plurality of conditionals.

14. The set of non-transitory, machine-readable media of claim 12, further comprising:

obtaining, from a user, a user-entered conditional; and updating the plurality of conditionals to comprise the user-entered conditional.

15. The set of non-transitory, machine-readable media of claim 12, wherein a first sequence of the set of sequences indicates a maximum difference threshold for a feature of the set of input feature values.

16. The set of non-transitory, machine-readable media of claim 12, wherein:

the knowledge base is associated with a plurality of weights, wherein each respective sequence of the set of sequences is associated with a respective weight of the plurality of weights;

determining a score based on whether the set of sub-conditional paths satisfies the set of criteria;

updating the score based on the plurality of weights; and selecting the candidate conditional as the selected conditional based on a determination that the score satisfies a score threshold.

17. The set of non-transitory, machine-readable media of claim 12, wherein the set of input feature values comprises an income value, an age, or a geographic location.

18. The set of non-transitory, machine-readable media of claim 12, the operations further comprising obtaining a value of the set of input feature values from a client computing device.

19. The set of non-transitory, machine-readable media of claim 12, wherein the knowledge base comprises a text document, and wherein a first sequence of the set of sequences comprises a token sequence of the text document.

20. The set of non-transitory, machine-readable media of claim 12, wherein:

the set of sequences comprises a first sequence;

the set of sub-conditional paths is a first set of sub-conditional paths;

the first sequence is associated with a first category;

the candidate conditional is a first candidate conditional;

filtering the plurality of conditionals comprises:

generating a second set of sub-conditional paths by providing, as a second input, a second candidate conditional of the plurality of conditionals to the prompt generator model; and associating the second candidate conditional with the first category based on a determination that the second set of sub-conditional paths does not satisfy a criterion associated with the first sequence; and the operations further comprise:

updating a user interface to present the second candidate conditional based on an association between the second candidate conditional with the first category.

* * * * *